United States Patent
Hefner et al.

(10) Patent No.: US 10,940,945 B2
(45) Date of Patent: Mar. 9, 2021

(54) ROTORCRAFT ANTI-TORQUE SYSTEM

(71) Applicant: Bell Helicopter Textron Inc., Fort Worth, TX (US)

(72) Inventors: Levi C. Hefner, Arlington, TX (US); Frank B. Stamps, Colleyville, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 188 days.

(21) Appl. No.: 15/796,910

(22) Filed: Oct. 30, 2017

(65) Prior Publication Data

US 2019/0127059 A1 May 2, 2019

(51) Int. Cl.
*B64C 27/82* (2006.01)
*B64C 27/12* (2006.01)

(52) U.S. Cl.
CPC .............. *B64C 27/82* (2013.01); *B64C 27/12* (2013.01); *B64C 2027/8227* (2013.01); *B64C 2027/8254* (2013.01); *B64C 2027/8272* (2013.01)

(58) Field of Classification Search
CPC . B64C 27/82; B64C 27/12; B64C 2027/8227; B64C 2027/8254; B64C 27/27; B64C 2027/9272; B64C 2027/8272
USPC .......................................................... 244/17
See application file for complete search history.

(56) References Cited

U.S. PATENT DOCUMENTS

| | | | |
|---|---|---|---|
| 2,415,622 A | 2/1947 | Bossi | |
| 7,731,121 B2 | 6/2010 | Smith et al. | |
| 8,590,827 B2 | 11/2013 | Sparks | |
| 8,636,242 B2 | 1/2014 | Smith | |
| 8,640,984 B2 | 2/2014 | Kebrle et al. | |
| 8,840,058 B2 | 9/2014 | Brand et al. | |
| 8,882,024 B1 | 11/2014 | McCollough et al. | |
| 8,960,599 B2* | 2/2015 | Edwards | B64C 15/00 244/207 |
| 8,989,921 B2 | 3/2015 | Nannoni et al. | |
| 9,026,274 B2 | 5/2015 | Hartman et al. | |
| 9,174,728 B2 | 11/2015 | Altmikus et al. | |
| 9,216,816 B2 | 12/2015 | Fortenbaugh et al. | |
| 9,584,086 B2 | 2/2017 | McCollough et al. | |
| 9,645,582 B2 | 5/2017 | Shue | |
| 9,870,004 B2 | 1/2018 | Atkins et al. | |
| 10,040,566 B2 | 8/2018 | Waltner | |

(Continued)

FOREIGN PATENT DOCUMENTS

| | | |
|---|---|---|
| EP | 2610176 A1 | 3/2013 |
| EP | 3254962 A1 | 12/2017 |

(Continued)

OTHER PUBLICATIONS

JP 2009/090755 A description machine translation, Espacenet.com, accessed Feb. 6, 2020. (Year: 2009).*

(Continued)

Primary Examiner — Magdalena Topolski
(74) Attorney, Agent, or Firm — Timmer Law Group, PLLC

(57) ABSTRACT

There is provided a rotorcraft, including a body, including a front portion and a tail portion; a main rotor system coupled to the front portion of the body, the main rotor system operable to provide a lifting force on the body; and an anti-torque system coupled to the tail portion of the body, the anti-torque system including a primary tail rotor system and a secondary tail rotor system; wherein the primary tail rotor system and the secondary tail rotor system are operable to provide a first anti-torque force and a second anti-torque force. In other aspects, there are methods of providing anti-torque force in a rotorcraft.

9 Claims, 8 Drawing Sheets

(56) References Cited

U.S. PATENT DOCUMENTS

| | | | |
|---|---|---|---|
| 2006/0049304 A1 | 3/2006 | Sanders, Jr. et al. | |
| 2009/0014581 A1* | 1/2009 | Kebrle | B64C 27/82 |
| | | | 244/17.21 |
| 2009/0140095 A1* | 6/2009 | Sirohi | B64C 27/22 |
| | | | 244/17.19 |
| 2011/0121128 A1* | 5/2011 | Balkus, Jr. | B64C 27/006 |
| | | | 244/17.21 |
| 2013/0032664 A1 | 2/2013 | Kebrle et al. | |
| 2013/0134256 A1 | 5/2013 | Gaillard | |
| 2014/0191079 A1 | 7/2014 | Ehinger et al. | |
| 2014/0374534 A1 | 12/2014 | McCollough et al. | |
| 2015/0001337 A1* | 1/2015 | McCollough | B64C 27/82 |
| | | | 244/17.21 |
| 2015/0246726 A1 | 9/2015 | Pongratz et al. | |
| 2016/0200430 A1 | 7/2016 | Dickman et al. | |
| 2017/0349274 A1* | 12/2017 | Fenny | B64C 27/04 |
| 2017/0349276 A1* | 12/2017 | Fenny | B64C 27/82 |
| 2017/0355448 A1 | 12/2017 | Fortenbaugh | |
| 2018/0178908 A1 | 6/2018 | Taheri | |
| 2019/0329876 A1* | 10/2019 | Brunetti | H02K 16/02 |
| 2020/0023958 A1 | 1/2020 | Acee et al. | |

FOREIGN PATENT DOCUMENTS

| | | | |
|---|---|---|---|
| EP | 3363741 | A1 | 8/2018 |
| EP | 3476731 | A1 | 5/2019 |
| EP | 3476731 | B1 | 2/2020 |
| EP | 3733509 | A1 | 4/2020 |
| GB | 2468787 | A | 9/2010 |
| JP | 2009090755 | A * | 4/2009 |
| JP | 2009090755 | A | 4/2009 |
| WO | 2011062783 | A2 | 5/2011 |
| WO | 2011062783 | A3 | 5/2011 |

OTHER PUBLICATIONS

NTSB's Probable Cause on Fatal EC135 Crash Blames CFIT, Other Factors; http://www.aero-news.net/index.cfm?do=main.textpost&id=48cc1b01-f801-4ec9-b607-ddcb3eab1389; Dec. 26, 2007.
EP Search Report, dated Mar. 6, 2019, by the EPO, re EP Patent App No. 18201186.6.
EP Exam Report, dated Mar. 19, 2019, by the EPO, re EP Patent App No. 18201186.6.
EP Exam Report, dated Oct. 22, 2019, by the EPO, re EP Patent App No. 18201186.6.
Communication under Rule 71(3) EPC—Intent to Grant, dated Jun. 4, 2020, by the EPO, re EP Patent App No. 18201186.6.
EP Search Report, dated Sep. 25, 2020, by the EPO, re EP App No. 20166915.7.
Exam Report, dated Oct. 14, 2020, by the EPO, re EP App No. 20166915.7.

* cited by examiner

ROTORCRAFT ANTI-TORQUE SYSTEM

BACKGROUND

Technical Field

The present disclosure relates to rotorcraft anti-torque systems and, more particularly, to aircraft power systems, components thereof, and features and methods relating thereto.

Description of Related Art

A traditional rotorcraft, such as a helicopter, includes one main rotor system to generate aerodynamic lift to support the weight of the rotorcraft in flight and thrust to counteract aerodynamic drag and move the rotorcraft in forward flight. A tail rotor system is typically included to generate thrust in the same direction as the main rotor system's rotation to counter the torque effect created by the main rotor system. The tail rotor system can fail due to hard landings, tail strikes, foreign objections, and/or wear and tear of components therein.

There is a need for an improved anti-torque system and methods for a providing anti-torque force in a rotorcraft.

SUMMARY

In a first aspect, there is provided a rotorcraft, including a body, including a front portion and a tail portion; a main rotor system coupled to the front portion of the body, the main rotor system operable to provide a lifting force on the body; and an anti-torque system coupled to the tail portion of the body, the anti-torque system including a primary tail rotor system and a secondary tail rotor system; wherein the primary tail rotor system and the secondary tail rotor system are operable to provide a first anti-torque force and a second anti-torque force.

In an embodiment, the tail portion includes a shroud extending around at least one of the primary tail rotor system and the secondary tail rotor system.

In an exemplary embodiment, the secondary tail rotor system includes at least one first tail rotor assembly.

In an embodiment, the at least one first tail rotor assembly is disposed adjacent to the primary tail rotor system.

In some embodiments, the at least one first tail rotor is disposed in at least one of the following: a top region of the shroud, a bottom region of the shroud, a leading edge region of the shroud, and a trailing edge region of the shroud.

In still another embodiment, the secondary tail rotor system includes a plurality of tail rotor assemblies.

In yet another embodiment, the plurality of tail rotor assemblies comprises a first tail rotor assembly and a second tail rotor assembly.

In an embodiment, the first tail rotor assembly is disposed in a top region of the shroud and the second tail rotor assembly is disposed in a bottom region of the shroud.

In another embodiment, the plurality of tail rotor assemblies includes a first tail rotor assembly and a third tail rotor assembly.

In an embodiment, the first tail rotor assembly is disposed in a trailing edge region of a shroud and the third tail rotor assembly is disposed in a leading edge region of the shroud.

In one embodiment, the rotorcraft includes an electrical power supply coupled by the body, the electrical power supply being conductively connected to provide electrical power to the secondary tail rotor system.

In another embodiment, the rotorcraft includes a second power system and a hydraulic drive system configured to drive the secondary tail rotor system.

In an embodiment, the rotorcraft includes a powertrain coupled to the body and an engine and a tail rotor drive shaft coupled to the engine, the tail rotor drive shaft being connected to provide mechanical power to the primary tail rotor system.

In another embodiment, the rotorcraft further includes a primary power source and a hydraulic drive system configured to drive the primary tail rotor system.

In still another embodiment, the secondary tail rotor system includes at least one of: a plurality of variable pitch secondary blades and/or a plurality of fixed pitch secondary blades.

In yet another embodiment, the rotorcraft includes a control system for selectively controlling the operation of each of the primary tail rotor system and the secondary tail rotor system.

In an embodiment, the secondary tail rotor system is configured to selectively provide supplemental anti-torque force to the rotorcraft.

In a second aspect, there is provided a method of providing anti-torque force in a rotorcraft, including providing, from a primary tail rotor system coupled to a body of the rotorcraft, a first anti-torque force on the body of the rotorcraft; and providing, from a secondary tail rotor system coupled to the body of the rotorcraft, a second anti-torque force on the body of the rotorcraft.

In an embodiment, the method further includes providing mechanical power to the primary tail rotor system.

In some embodiments, the method further includes providing electrical power to the secondary tail rotor system.

In one embodiment, the secondary tail rotor system comprises at least one of: a plurality of variable pitch secondary blades and/or a plurality of fixed pitch secondary blades.

In still another embodiment, the method includes adjusting the pitch of the plurality of variable pitch secondary blades; and rotating the plurality of variable pitch secondary blades by a second power system at a secondary speed.

In an embodiment, the secondary speed includes at least one of a constant speed and/or a variable speed.

In still another embodiment, the method includes rotating the plurality of fixed pitch secondary blades by a second power system at a secondary speed; wherein the secondary speed is a variable speed.

In yet another embodiment, the primary tail rotor system includes a plurality of fixed pitch primary blades, and the method further includes rotating the plurality of fixed pitch primary blades by a first power source at a primary speed; wherein the primary speed is a variable speed.

In an embodiment, the method further includes determining an anti-torque control input; receiving the anti-torque control input by a control system; selectively controlling the amount of the first anti-torque force in response to the anti-torque control input; selectively controlling the amount of the second anti-torque force in response to the anti-torque control input.

In an embodiment, the method further includes determining the response time of the primary tail rotor system; determining the response time of the secondary tail rotor system; and selecting either the primary tail rotor system or the secondary tail rotor system for operation based upon the fastest response time.

In a third aspect, there is provided a method of providing anti-torque force in a rotorcraft, including providing a primary tail rotor system coupled to a body of the rotorcraft configured to provide a first anti-torque force on the body of the rotorcraft; providing a secondary tail rotor system coupled to the body of the rotorcraft configured to provide a second anti-torque force on the body of the rotorcraft; and selectively controlling the secondary tail rotor system to provide a second anti-torque force.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of rotorcraft anti-torque systems and methods therefor are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

This disclosure depicts and describes anti-torque systems for rotorcraft and methods relating thereto. The embodiments of the anti-torque systems and methods relating thereto will be described with reference to rotorcraft 100. The anti-torque systems and methods relating thereto depicted and/or described herein can be used with any aircraft having one or more rotor assemblies, including tiltrotor aircrafts, helicopters, autogyros, tilt wing aircrafts, unmanned aerial vehicles (UAVs), hovercrafts, and other vertical lift or VTOL aircrafts, or can further be used with any device having one or more components having rotor assemblies. Further, any features of one embodiment of the anti-torque systems and methods relating thereto in this disclosure can be used with any other embodiment of the anti-torque systems and methods such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Figure 1A:
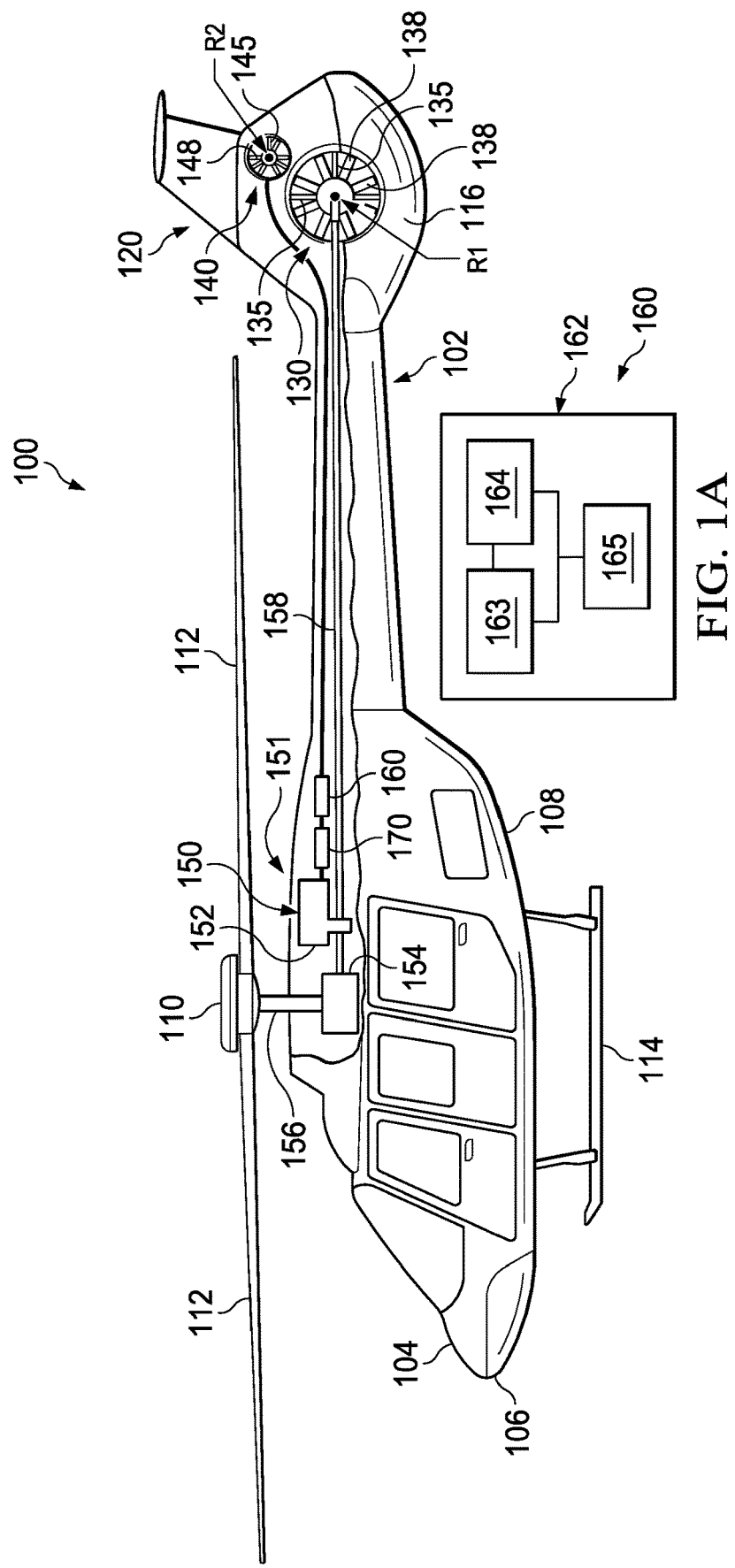
FIG. 1A shows a partial cut-away side view of a rotorcraft, according to one example embodiment.

FIG. 1A is a schematic representation of a rotorcraft, generally shown as 100, including a tail portion 102 which embodies the principles of the present invention. The rotorcraft 100 includes a body 104 with a front portion 106 and a tail portion 102. The body 104 includes a fuselage 108 in the front portion 106. Fuselage 108 can be coupled to the main rotor system 110 and blades 112 such that the main rotor system 110 and blades 112 may move the rotorcraft 100 through the air. Landing gear 114 supports rotorcraft 100 when rotorcraft 100 is landing and/or when rotorcraft 100 is on the ground.

Figure 1B:
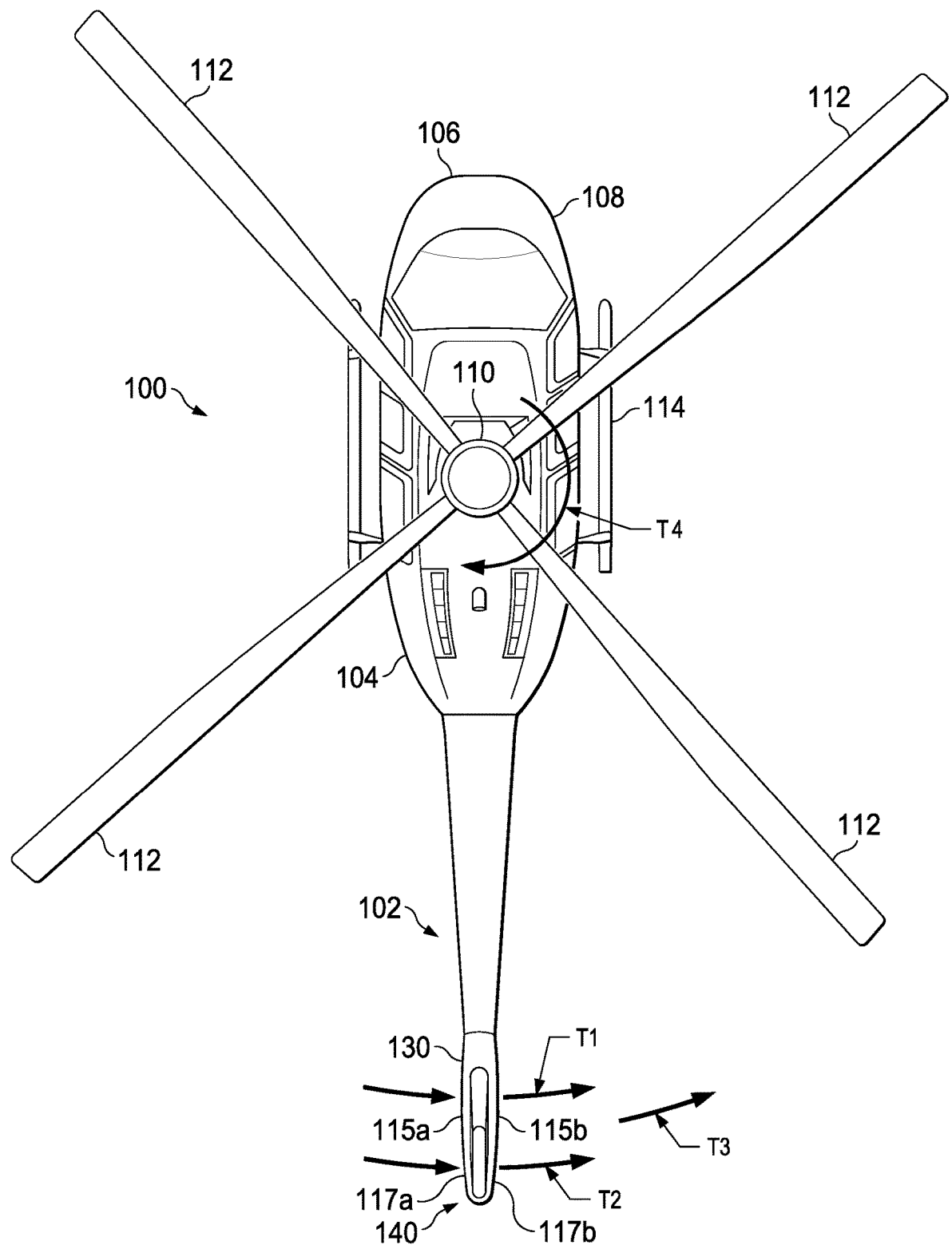
FIG. 1B shows a top view of the rotorcraft of FIG. 1A.
Figure 1C:
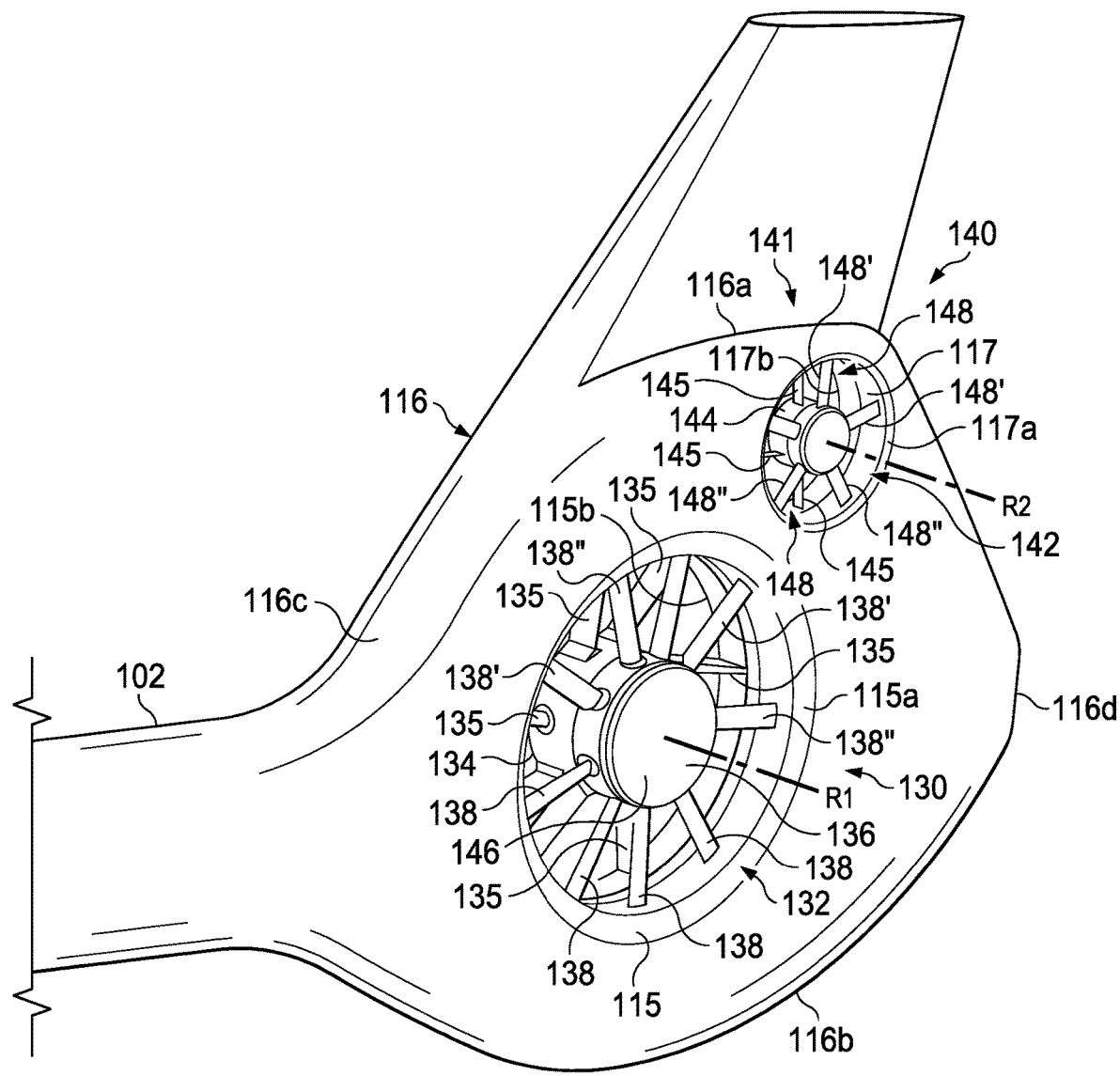
FIG. 1C shows a perspective view of the rotorcraft of FIG. 1A.

Referring to FIGS. 1A-1C, the tail portion 102 includes an anti-torque system 120 associated therewith. In an embodiment, the anti-torque system 120 includes a primary tail rotor system 130, a secondary tail rotor system 140, and a control system 170. In some embodiments, the primary tail rotor system 130 can provide the majority of the anti-torque force. The secondary tail rotor system 140 can provide additional anti-torque force and/or additional redundancy for safety. The anti-torque system 120 can be supported within ducts that extend transversely through shroud 116 of the tail portion 102. This type of anti-torque system 120 can be referred to as a Fenestron (or fantail). The shroud 116 can include a top region 116a, a bottom region 116b, a leading edge region 116c, and a trailing edge region 116d. The shroud 116 includes a primary duct 115 and a secondary duct 117 that are each generally annular in shape. Each of the primary and secondary ducts 115, 117 include a leading edge 115a, 117a and a trailing edge 115b, 117b. During operation of the anti-torque system 120, air is drawn from the leading edge 115a, 117a by the respective primary and secondary tail rotor system 130, 140 and exits at the trailing edge 115b, 117b.

The primary tail rotor system 130 is disposed in primary duct 115 and includes a rotor 132 and a stator 134 downstream of the rotor 132. The rotor 132 is rotatably mounted within primary duct 115 and includes a hub 136 and blades 138. The rotor 132 is mounted for rotation about a first axis R1 that is substantially coaxial with the axis of the primary duct 115. The rotor 132 can include any suitable number of blades 138 (e.g., seven blades 138 as illustrated in FIG. 1A). The blades 138 can be collectively controlled such that the pitch angle of each blade can be adjusted during operation. During operation, blades 138 in the primary tail rotor system 130 can generate a first anti-torque force T1.

Stator 134 is fixedly mounted within primary duct 115 and includes a hub and a plurality of fixed vanes 135 that extend from the hub to the secondary duct 115. Stator 134 can include any suitable number of fixed vanes 135, e.g., equal to or unequal to the number of rotor blades 138.

The primary tail rotor system 130 can be powered by a first power system 150. First power system 150 can be a conventional powertrain system 151 coupled to the body 104 as shown in FIG. 1A. Power train system 151 can include an engine 152, a gearbox 154, a main rotor mast 156, and a tail rotor drive shaft 158. Engine 152 supplies torque to the main rotor mast 156 via gearbox 154 for rotating of blades 112. Engine 152 also supplies torque to tail rotor drive shaft 158 for rotating of blades 138 of the primary tail rotor system 130. Power train system 151 may include a collective control system for selectively controlling the pitch of the blades 138 in order to selectively control direction and thrust of the anti-torque system 120. It should be appreciated that the first power system 150 may take on a wide variety of configurations dependent upon the size and arrangement of the rotorcraft 100. For example, first power system 150 can be a hydraulic power system including a hydraulic pump and fluid reservoir or other power system.

In some embodiments, the blades 138 of the primary tail rotor system 130 can include a plurality of variable pitch secondary blades 138'. The pitch angle of the plurality of variable pitch primary blades 138' can be adjusted during operation. The plurality of variable pitch primary blades 138' can be rotated by the first power system 150 at a primary speed to generate anti-torque thrust T1. In some embodiments, the primary speed can be rotated at a constant speed. In other embodiments, the primary speed can be a variable speed (variable RPM).

In another embodiment, the blades 138 of the primary tail rotor system 130 can include a plurality of fixed pitch primary blades 138". The plurality of fixed pitch primary blades 138" can be rotated by the first power system 150 at a primary speed to generate anti-torque thrust T1. In a preferred embodiment, the primary speed is a variable speed (variable RPM).

The secondary tail rotor system 140 is disposed in secondary duct 117 and includes at least one tail rotor assembly 141 including a rotor 142 and a stator 144 downstream of the rotor 142. The rotor 142 is rotatably mounted within secondary duct 117 and includes a hub 146 and blades 148. The rotor 142 is mounted for rotation about a second axis R2 that is substantially coaxial with the axis of the secondary duct 117. The second axis R2 of the secondary tail rotor a system 140 is substantially parallel and non-coaxial with respect to the first axis R1 in the primary tail rotor system 130. The rotor 142 can include any suitable number of blades 148 (e.g., six blades 148 as illustrated in FIG. 1A). The blades 148 can be collectively controlled such that the pitch angle of each blade can be adjusted during operation. During operation, blades 148 in the secondary tail rotor system 140 can generate a second anti-torque force T2.

The stator 144 is fixedly mounted within secondary duct 117 and includes a hub and a plurality of fixed vanes 145 that extend from the hub to the secondary duct 117. The stator 144 can include any suitable number of fixed vanes 145, e.g., equal to or unequal to the number of rotor blades 148.

The secondary tail rotor system 140 can be operated by a second power system 160. Second power system 160 can be an electrical power supply 162, as shown in FIG. 1A. The electrical power supply 162 can be produced from multiple power sources, such as generators, batteries, auxiliary power units (APUs) and/or other power sources that supply power interchangeably or not interchangeably to various electrical components of the rotorcraft 100. In an embodiment, the electrical power supply 162 can include an electric generator 163, a battery 164, and a fuel cell 165 being conductively connected to the secondary tail rotor system 140 to rotate the blades 148 therein. The electrical power supply 162 may include a collective control system for selectively controlling the pitch of the blades 148 in order to selectively control direction and thrust of the anti-torque system 120. It should be appreciated that the second power system 160 may take on a wide variety of configurations dependent upon the size and arrangement of the rotorcraft 100.

The secondary tail rotor system 140 can include at least one tail rotor assembly 141 as shown in FIGS. 1A-1C. The tail rotor assembly 141 can be a first tail rotor assembly disposed generally in top region 116a of shroud 116. In some embodiments, as shown in FIGS. 1A-1C, the first tail rotor assembly 141 has a diameter less than the diameter of the primary tail rotor system 130.

In some embodiments, the blades 148 of the secondary tail rotor system 140 can include a plurality of variable pitch secondary blades 148'. The pitch angle of the plurality of variable pitch secondary blades 148' can be adjusted during operation. The plurality of variable pitch secondary blades 148' can be rotated by the second power system 160 at a secondary speed to generate the anti-torque thrust T2. In some embodiments, the secondary speed can be rotated at a constant speed. In other embodiments, the secondary speed can be a variable speed (variable RPM).

In another embodiment, the blades 148 of the secondary tail rotor system 140 can include a plurality of fixed pitch secondary blades 148". The plurality of fixed pitch secondary blades 148" can be rotated by the second power system 160 at a secondary speed to generate the anti-torque thrust T2. In a preferred embodiment, the secondary speed is a variable speed (variable RPM).

Figure 2:
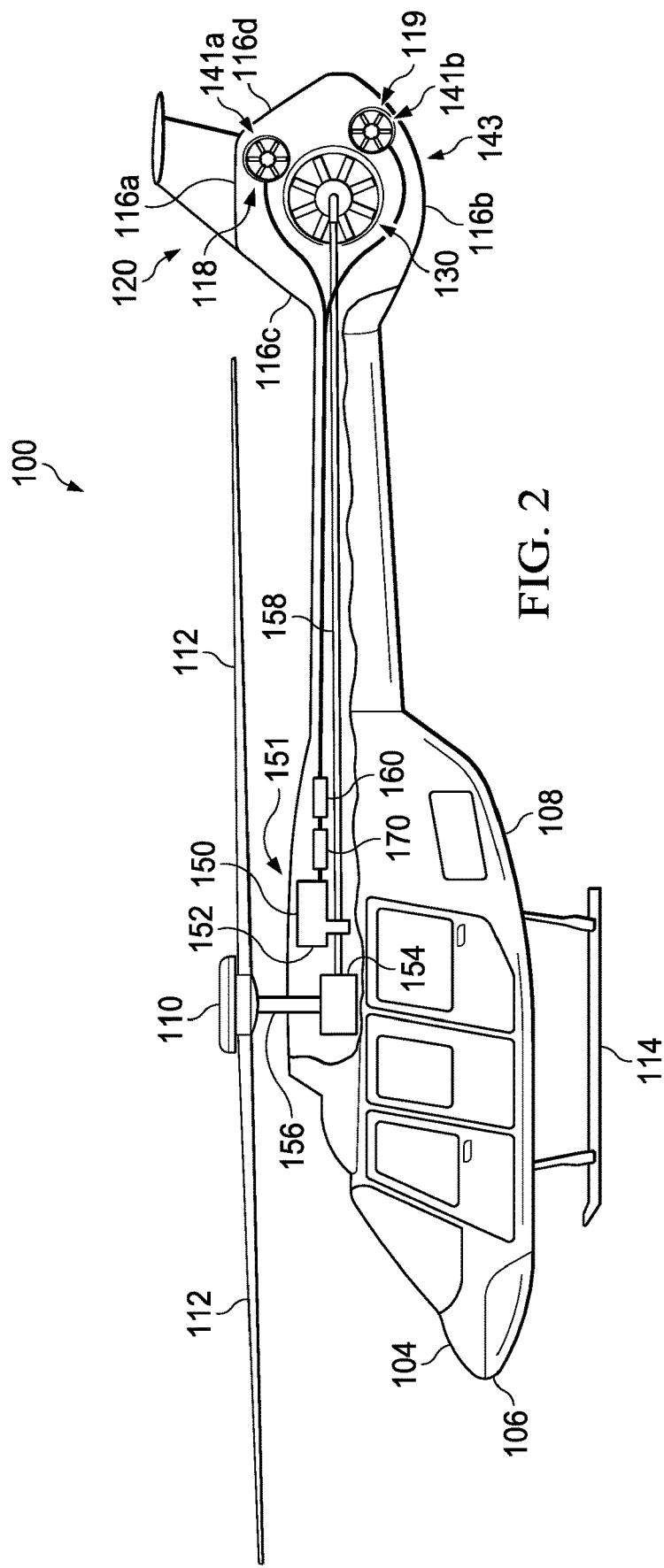
FIG. 2 shows a partial cut-away side view of a rotorcraft, according to an exemplary embodiment.
Figure 3:
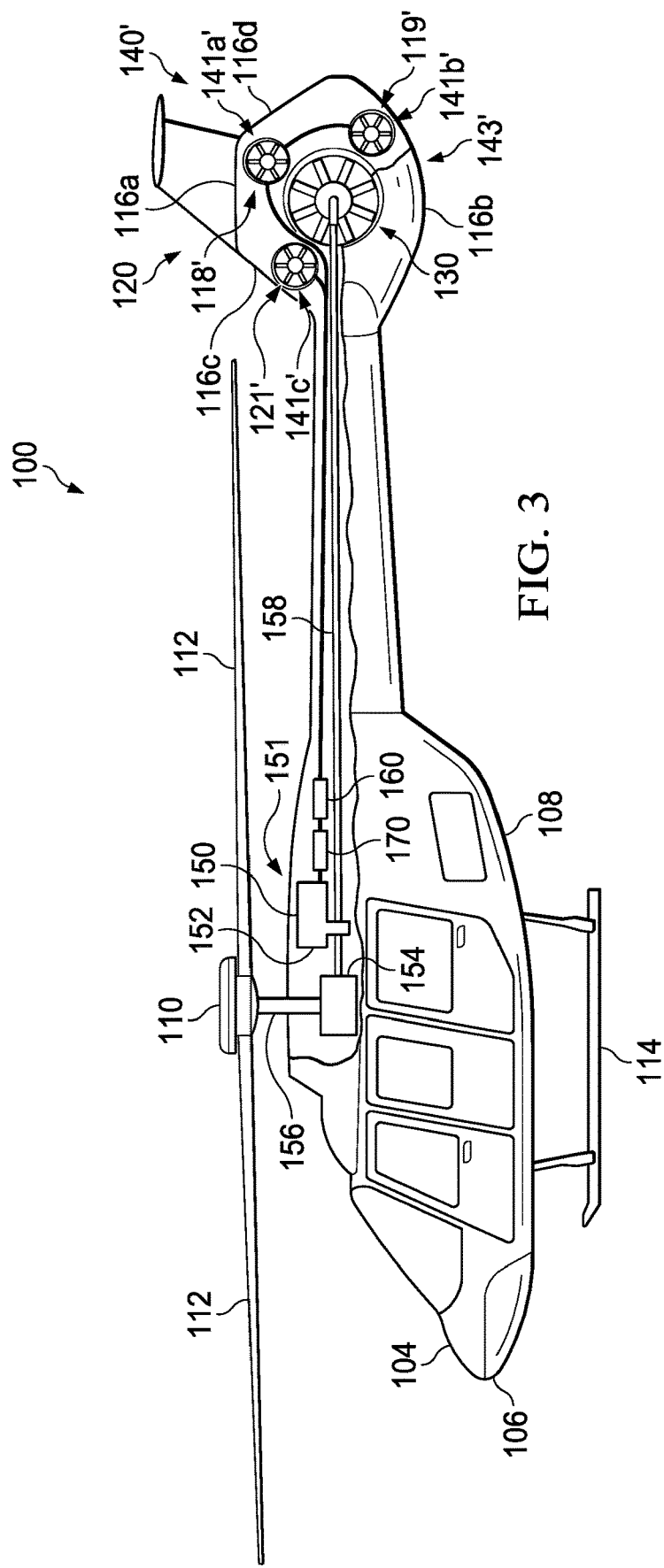
FIG. 3 shows a partial cut-away side view of a rotorcraft, according to one example embodiment.

In another exemplary embodiment, referring now to FIGS. 2-3, the secondary tail rotor system 140 can include additional tail rotor assemblies 141. For example, the secondary tail rotor system 140 can include a plurality of tail rotor assemblies 141. As shown in FIG. 2, the plurality of tail rotor assemblies 143 can include a first tail rotor assembly 141a and a second tail rotor assembly 141b to provide additional anti-torque force and/or additional redundancy for safety. The first and second tail rotor assemblies 141a and 141b are disposed in a third duct 118 and fourth duct 119, respectively. The first tail rotor assembly 141a is disposed in the top region 116a of the shroud 116. The second tail rotor assembly 141b is disposed in the bottom region 116b of the shroud 116. In this exemplary embodiment, both the first and second tail rotor assemblies are disposed in the trailing edge region 116d of the shroud 116. In another exemplary embodiment, as shown in FIG. 3, like features of the plurality of tail rotor assemblies 143' are identified by like numerals with a primed suffix ('), the plurality of tail rotor assemblies 143' includes a first tail rotor assembly 141a', a second tail rotor assembly 141b', and a third tail rotor assembly 141c' to provide even more additional anti-torque force and/or additional redundancy for safety. The third tail rotor assembly 141c' is disposed in fifth duct 121'. The third tail rotor assembly 141c' is disposed in the leading edge region of the shroud 116. It will be appreciated that the secondary tail rotor system 140 may take on a wide variety of configurations (e.g., the number of tail rotor assemblies 141, the arrangement of the tail rotor assemblies 141, the size of the tail rotor assemblies, the power source of the tail rotor assemblies 141, the components of the tail rotor assembly 141) that are sufficient to provide additional anti-torque force and/or provide redundancy for safety for various rotorcraft.

As shown in the example of FIG. 1B, when main rotor blades 112 rotate to create a first lifting force, body 104 counters with a torque T4 in the direction opposite to the rotational direction of the blades 112. The anti-torque system 120 can generate a total anti-torque force (or torque T3) in a direction opposite to that of T4 by, for example, rotating blades 138 in the primary tail rotor system 130 and/or rotating blades 148 in the secondary tail rotor system 140. In the exemplary embodiment shown in FIGS. 1A-1C, rotorcraft 100 with the main rotor system 110 and the anti-torque system 120 can maintain a heading by providing sufficient total anti-torque force T3 such that T3 equals torque T4. The total anti-torque force T3 can be greater than torque T4 to cause rotorcraft 100 to rotate in a first direction, whereas providing total anti-torque force T3 less than torque T4 can cause rotorcraft 100 to rotate in a direction opposite to the first direction.

In an embodiment, total anti-torque force T3 is generated by the anti-torque system 120 rotating both blades 138 in the primary tail rotor system 130 and/or blades 148 in the secondary tail rotor system 140. Blades 138, 148 in the primary and secondary tail rotor systems 130, 140 can work in conjunction to provide first and second anti-torque forces T1, T2 sufficient to equal the total anti-torque force T3 (e.g., T3=T1+T2). Since the secondary tail rotor system 140 provides an additional source of second anti-torque force T2, the configuration and operation of the primary tail rotor system 130 can be modified as compared to a conventional tail rotor assembly having only one tail rotor system. The first anti-torque force T1 generated by the primary tail rotor system 130 can be less than an anti-torque force generated by a conventional tail rotor assembly, which can provide several advantages. In an exemplary embodiment, blades 138 of the primary tail rotor system 130 can be rotated at lower speeds due to lower anti-torque requirements as compared to a conventional tail rotor assembly, which can advantageously reduce blade noise and enable quieter operation of the rotorcraft 100. In another exemplary embodiment, the diameter of the primary tail rotor system 130 can be less than the diameter of a conventional tail rotor assembly, which can provide at least one of the following advantages: reduced weight of the primary tail rotor system 130 and quieter blades 138 during operation due to the reduced blade length.

Blades 138 in the primary tail rotor system 130 and blades 148 in the secondary tail rotor system 140 can be operated completely independent of each other to provide full redundancy for the anti-torque system 120. In the event of failure of the primary tail rotor system 130, then second anti-torque force T2 can be generated by blades 148 in the secondary tail rotor system 140 such that second anti-torque force T2 equals total anti-torque force T3 (e.g., T3=T2). Conversely, in the event of failure the secondary tail rotor system 140, then first anti-torque force T1 can be generated by blades 138 in the primary tail rotor system 130 such that first anti-torque force T1 equals total anti-torque force T3 (e.g., T3=T1).

In one embodiment, the first anti-torque force T1 generated by the primary tail rotor system 130 is substantially all of the total anti-torque force T3 needed during operation (e.g., the primary tail rotor 130 provides the majority of the total anti-torque force T3). When total anti-torque force T3 increases, the secondary tail rotor system 140 can be activated to provide supplemental anti-torque force (e.g., second anti-torque force T2).

Figure 4:
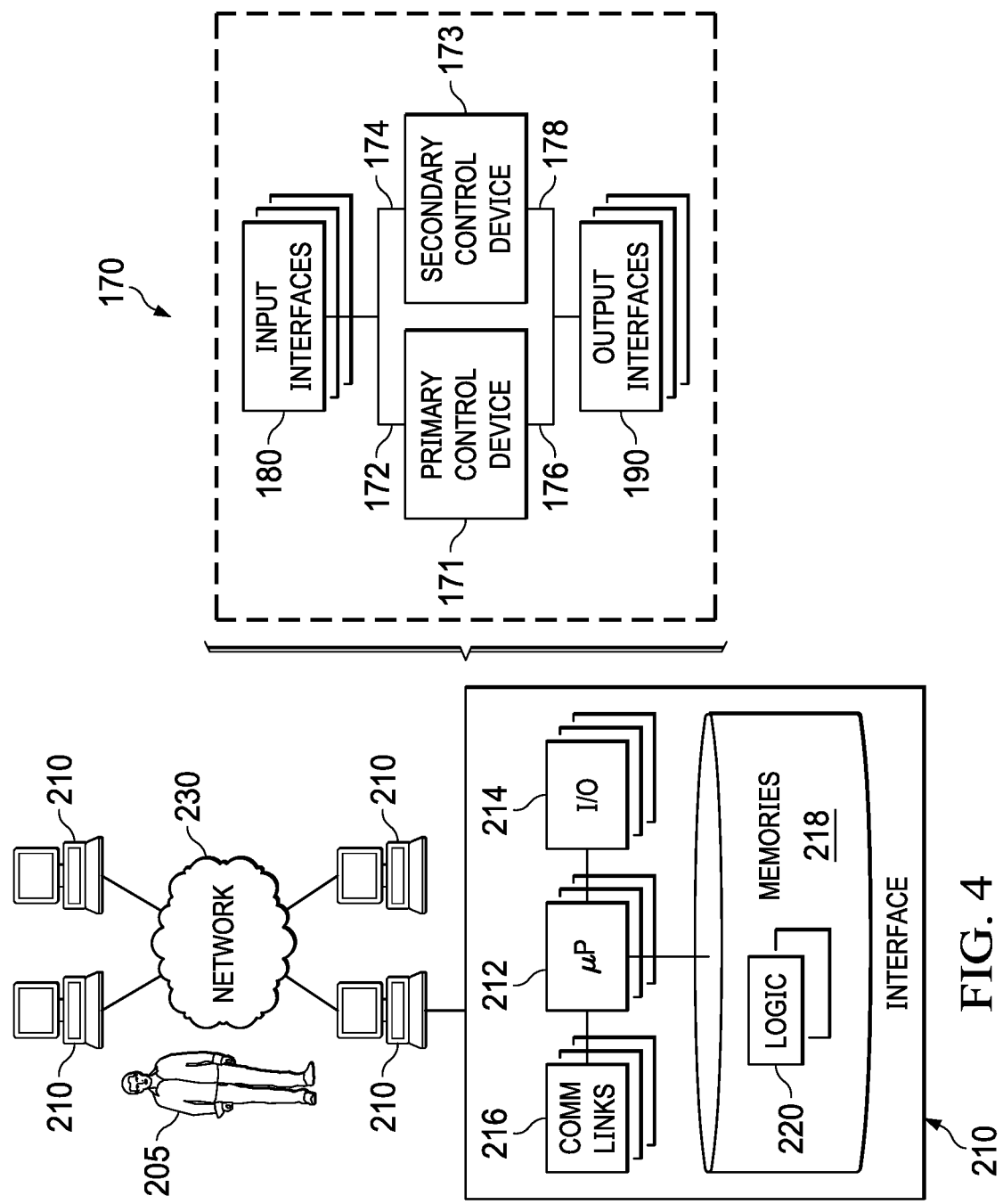
FIG. 4 shows control system associated with an anti-torque system, according to an exemplary embodiment.

Primary and secondary tail rotor systems 130, 140 and any other anti-torque system 120 components can be selectively controlled by control system 170. For example, as shown in FIG. 4, the control system 170 can include a primary control device 171, a secondary control device 173, input interfaces 180, and output interfaces 190.

Input interfaces 180 receive input information 172, 174 from a variety of sources (e.g. sensors, primary tail rotor system 130, secondary tail rotor system 140, pilot controls, flight control systems). Such input information may include, for example, information indicative of the speed and/or collective pitch blades 138, 148 of the primary and secondary tail rotor systems 130, 140. As another example, input interfaces 180 can receive pilot commands (e.g., a pilot yaw command transmitted as a result of the pilot pressing a foot down on a rudder pedal in the cockpit). In another example, input interfaces 180 receive commands from a fly-by-wire and/or other flight control systems. Another example of input interfaces 180 can include inputs from sensors associated with the rotorcraft 100, such as airspeed or density altitude sensors.

The primary and secondary control devices 171, 173 receive inputs 172, 174 to determine anti-torque instructions. The primary and secondary control devices 171, 173 can be operated independently to provide redundancy and/or can be combined as one device. The primary and secondary control devices 171, 173 generate anti-torque instructions and transmit output commands 176, 178 to the anti-torque system 120 (e.g., primary tail rotor system 130, secondary tail rotor system 140) via the output interfaces 190. For example, the primary control device 171 can generate instructions for selectively controlling the amount of the first anti-torque force T1 generated by the primary tail rotor system 130 (e.g., controlling speed of blades 138, collective pitch of blades 138). In another example, secondary control device 173 can generate instructions for selectively controlling the amount of the second anti-torque force T2 generated by the secondary tail rotor system 140 (e.g., controlling speed of blades 148, collective pitch of blades 148). In another example, primary and secondary control devices 171, 173 can send output commands 176, 178 to control rotorcraft yaw.

In operation, according to some example embodiments, an input interface 180 receives a request to change an amount of generated total anti-torque force T3. In one example embodiment, a pilot provides the request to change an amount of total anti-torque force T3 by, for example, pressing a foot down on a rudder pedal in the cockpit. In another example embodiment, a flight control system provides the request to change an amount of generated anti-torque force by, for example, transmitting a signal to the input interface 180 representative of the request.

The input interface 180 may receive a request to change an amount of total anti-torque force T3 for a variety of reasons. For example, the amount of total anti-torque force T3 may be changed to change the yaw of the aircraft. As another example, the amount of total anti-torque force T3 may be changed due to a change in outside conditions (e.g., increase in cross-wind speed). As yet another example, the amount of total anti-torque force T3 may be changed due to a change in aircraft operations. For example, as explained above, the total anti-torque force T3 generated by the anti-torque system 120 will increase if the relative airspeed of rotorcraft 100 increases. Accordingly, it may be necessary to increase the first and/or second anti-torque forces T1, T2 generated by the primary and secondary tail rotors 130, 140 so as to maintain the equation T3=T1+T2=T3.

In one embodiment, the primary tail rotor system 130 is mechanically powered by the tail rotor drive shaft 158, while the secondary tail rotor system 140 is electrically powered by electrical power supply 162. The response times of the primary and secondary tail rotor systems 130, 140 are a function of the energy provided by their respective power sources (e.g., first power system 150, second power system 160). Accordingly, in some embodiments, the primary tail rotor system 130 can have a faster response time than the secondary tail rotor system 140. In other embodiments, the secondary tail rotor system 140 can have a faster response time than the primary tail rotor system 130. Since the response times of the primary and secondary rotor systems 130, 140 are different, the control system 170 (e.g., the primary control device 171, the secondary control device 173) can be configured to select the tail rotor system (e.g., select either the primary or secondary tail rotor system 130, 140) having the fastest (e.g., shortest) response time in certain operational situations (e.g., when torque T4 from the main rotor blade suddenly increases).

Users 205 may access control system 170 through computer systems 210. For example, in some embodiments, users 205 may provide flight control inputs that may be processed using a computer system 210. Users 205 may include any individual, group of individuals, entity, machine, and/or mechanism that interacts with computer systems 210. Examples of users 205 include, but are not limited to, a pilot, service person, engineer, technician, contractor, agent, and/or employee. Users 205 may be associated with an organization. An organization may include any social arrangement that pursues collective goals. One example of an organization is a business. A business is an organization designed to provide goods or services, or both, to consumers, governmental entities, and/or other businesses.

Computer system 210 may include processors 212, input/output devices 214, communications links 216, and memory 218. In other embodiments, computer system 210 may include more, less, or other components. Computer system 210 may be operable to perform one or more operations of various embodiments. Although the embodiment shown provides one example of computer system 210 that may be used with other embodiments, such other embodiments may utilize computers other than computer system 210. Additionally, embodiments may also employ multiple computer systems 210 or other computers networked together in one or more public and/or private computer networks, such as one or more networks 230. Computer system 210 may exist wholly or partially on-board the aircraft, off-board the aircraft (e.g., in a ground station), or a combination of the two.

Processors 212 represent devices operable to execute logic contained within a medium. Examples of processor 212 include one or more microprocessors, one or more applications, and/or other logic. Computer system 210 may include one or multiple processors 212.

Input/output devices 214 may include any device or interface operable to enable communication between computer system 210 and external components, including communication with a user or another system. Example input/output devices 214 may include, but are not limited to, a mouse, keyboard, display, and printer.

Network interfaces 216 are operable to facilitate communication between computer system 210 and another element of a network, such as other computer systems 210. Network interfaces 216 may connect to any number and combination of wireline and/or wireless networks suitable for data transmission, including transmission of communications. Network interfaces 216 may, for example, communicate audio and/or video signals, messages, internet protocol packets, frame relay frames, asynchronous transfer mode cells, and/or other suitable data between network addresses. Network interfaces 216 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 218 represents any suitable storage mechanism and may store any data for use by computer system 210. Memory 218 may comprise one or more tangible, computer-readable, and/or computer-executable storage medium. Examples of memory 218 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 218 stores logic 220. Logic 220 facilitates operation of computer system 210. Logic 220 may include hardware, software, and/or other logic. Logic 220 may be encoded in one or more tangible, non-transitory media and may perform operations when executed by a computer. Logic 220 may include a computer program, software, computer executable instructions, and/or instructions capable of being executed by computer system 210. Example logic 220 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 220 may also be embedded within any other suitable medium without departing from the scope of the invention.

Various communications between computers 210 or components of computers 210 may occur across a network, such as network 230. Network 230 may represent any number and combination of wireline and/or wireless networks suitable for data transmission. Network 230 may, for example, communicate internet protocol packets, frame relay frames, asynchronous transfer mode cells, and/or other suitable data between network addresses. Network 230 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 230, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Figure 5:
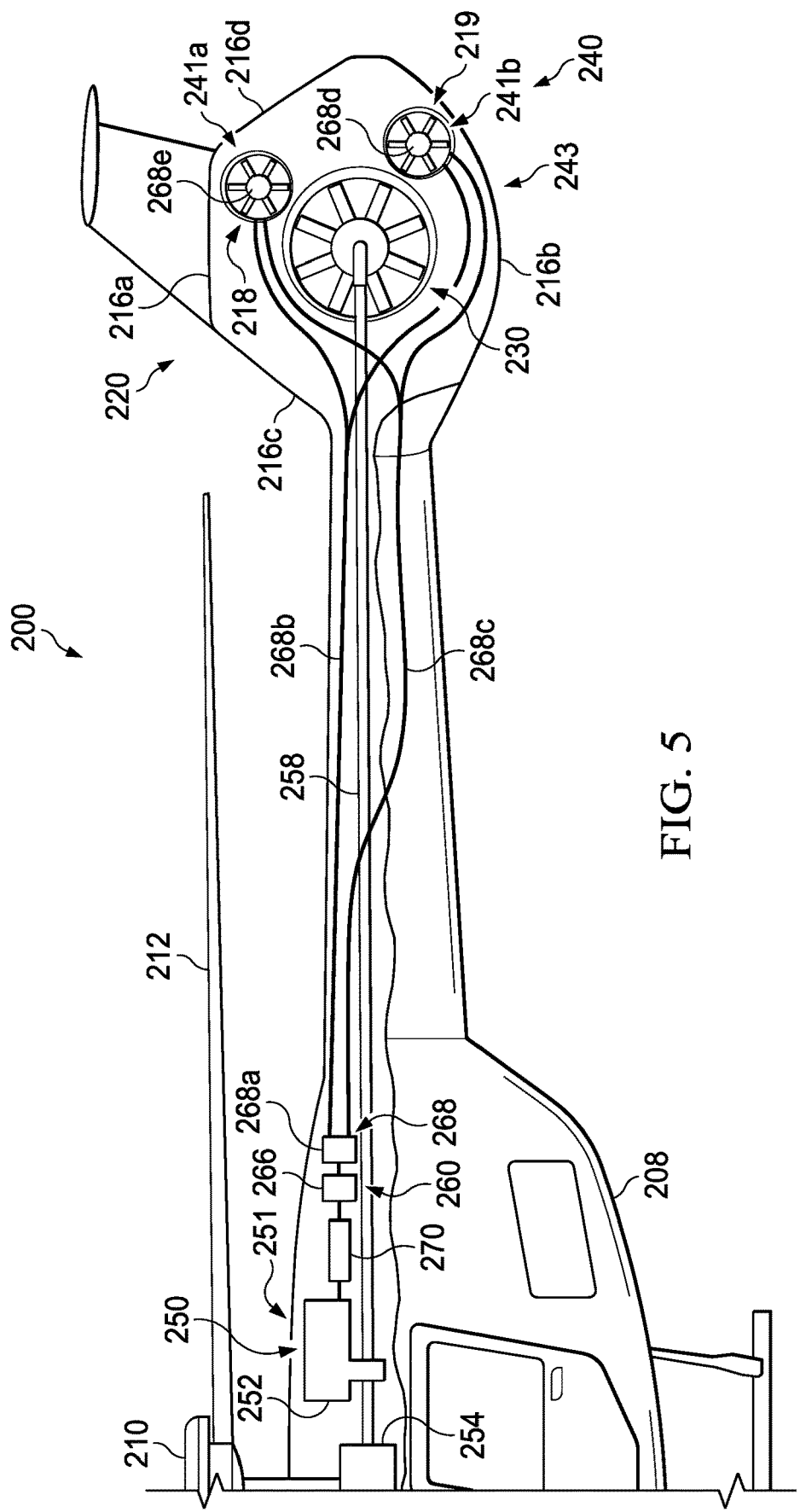
FIG. 5 shows a partial cut-away side view of a rotorcraft, according to an exemplary embodiment.

FIG. 5 depicts another embodiment of rotorcraft 200 with anti-torque system 220. Certain features of the rotorcraft 200 are as described above and bear similar reference characters to the rotorcraft 200, but with a leading '2' rather than a leading '1'. The secondary tail rotor system 240 is powered by second power system 260. The second power system 260 can include a secondary power source 266 and a drive system 268. The secondary power source 266 can be, for example, a traditional aircraft engine and/or an electrical power supply. The secondary power source 266 is coupled to a drive system 268, which in the embodiment shown, is a hydraulic drive system including a hydraulic pump 268a, high pressure drive line 268b, return line 268c, and hydraulic motors 268d, 268e. The hydraulic drive system 268 is operably coupled to the plurality of tail rotor assemblies 243 in the secondary tail rotor system 240. The hydraulic drive system 268 provides power to hydraulic motors 268d, 268e in the plurality of tail rotor assemblies 243 to rotate the rotor blades therein and provide a second anti-torque force T2.

Figure 6:
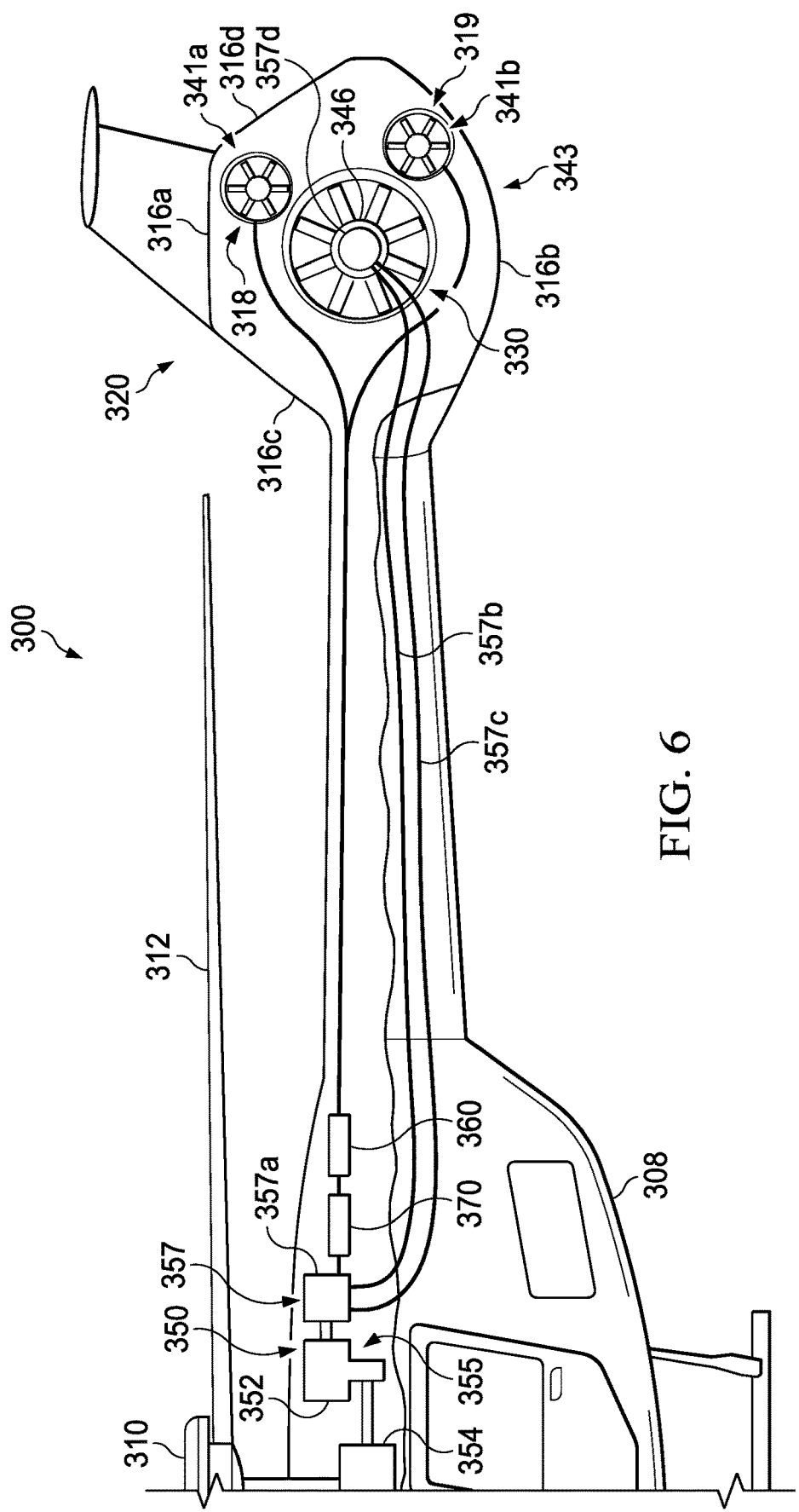
FIG. 6 shows a partial cut-away side of a rotorcraft, according to one example embodiment.

In another example, FIG. 6 depicts another embodiment of rotorcraft 300 with anti-torque system 320. Certain features of the rotorcraft 300 are as described above and bear similar reference characters to the rotorcraft 300, but with a leading '3' rather than a leading '1'. The primary tail rotor system 330 is powered by first power system 350. The first power system 350 can include a primary power source 355 and a drive system 357. The primary power source 355 can be, for example, a traditional aircraft engine 352. The primary power source 355 is coupled to a drive system 357, which in the embodiment shown, is a hydraulic drive system including a hydraulic pump 357a, high pressure drive line 357b, return line 357c, and hydraulic motor 357d. The hydraulic drive system 357 is operably coupled to the primary tail rotor system 330. The hydraulic drive system 357 provides power to hydraulic motor 357d mounted in hub 346 to rotate rotor blades therein and provide a first anti-torque force T1.

The anti-torque systems and methods relating thereto detailed above provide at least one of the following advantages: improved reliability of the rotorcraft; improved safety of the rotorcraft; different power sources for the primary and secondary tail rotor systems, which provides redundant power systems for the anti-torque system; reduced size of the primary tail rotor system; and quieter operation of the rotorcraft.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Terms such as "primary", "secondary", "first", "second", "third", and "fourth" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A rotorcraft, comprising:
 a body, including a front portion and a tail portion having
  a shroud including a primary duct and a secondary duct disposed adjacent to the primary duct, each of the primary duct and the secondary duct extend transversely through the shroud;

a main rotor system coupled to the front portion of the body, the main rotor system operable to provide a lifting force on the body;

an anti-torque system coupled to the tail portion of the body, the anti-torque system comprising a primary tail rotor system disposed in the primary duct and a secondary tail rotor system comprising a first tail rotor assembly disposed in the secondary duct, the first tail rotor assembly having a diameter less than the diameter of the primary tail rotor system;

a powertrain coupled to the body, the powertrain including an engine and a tail rotor drive shaft coupled to the engine, the tail rotor drive shaft being connected to provide mechanical power to the primary tail rotor system; and an electrical power supply coupled to the body, the electrical power supply being conductively connected to the secondary tail rotor system to provide electrical power thereto;

wherein the primary tail rotor system and the secondary tail rotor system are operable to provide a first anti-torque force and a second anti-torque force.

2. The rotorcraft of claim 1, wherein the secondary tail rotor system has a faster response time than the primary tail rotor system.

3. The rotorcraft of claim 1, wherein the first tail rotor assembly is disposed in at least one of the following: a top region of the shroud, a bottom region of the shroud, a leading edge region of the shroud, and a trailing edge region of the shroud.

4. A rotorcraft comprising:

a body, including a front portion and a tail portion having a shroud including a primary duct, a secondary duct disposed adjacent to the primary duct, and a third duct disposed adjacent to the primary duct, each of the primary duct, the secondary duct, and the third duct extend transversely through the shroud;

a main rotor system coupled to the front portion of the body, the main rotor system operable to provide a lifting force on the body;

an anti-torque system coupled to the tail portion of the body, the anti-torque system comprising a primary tail rotor system disposed in the primary duct and a secondary tail rotor system comprising a first tail rotor assembly disposed in the secondary duct and a second tail rotor assembly disposed in the third duct, the first tail rotor assembly and the second tail rotor assembly having a diameter less than the diameter of the primary tail rotor system;

a powertrain coupled to the body, the powertrain including an engine and a tail rotor drive shaft coupled to the engine, the tail rotor drive shaft being connected to provide mechanical power to the primary tail rotor system; and an electrical power supply coupled to the body, the electrical power supply being conductively connected to the secondary tail rotor system to provide electrical power thereto;

wherein the primary tail rotor system and the secondary tail rotor system are operable to provide a first anti-torque force and a second anti-torque force.

5. The rotorcraft of claim 4, wherein at least one of the first tail rotor assembly and the second tail rotor assembly is disposed in at least one of the following: a leading edge region of the shroud and a trailing edge region of the shroud.

6. The rotorcraft of claim 4, wherein at least one of the first tail rotor assembly and the second tail rotor assembly is disposed in at least one of the following: a top region of the shroud and a bottom region of the shroud.

7. The rotorcraft of claim 1, wherein the secondary tail rotor system comprises at least one of: a plurality of variable pitch secondary blades and/or a plurality of fixed pitch secondary blades.

8. The rotorcraft of claim 1, further comprising a control system for selectively controlling the operation of each of the primary tail rotor system and the secondary tail rotor system.

9. The rotorcraft of claim 1, wherein the secondary tail rotor system is configured to selectively provide supplemental anti-torque force to the rotorcraft.

* * * * *